(12) United States Patent
Yamazaki et al.

(10) Patent No.: US 7,226,556 B2
(45) Date of Patent: Jun. 5, 2007

(54) METHOD FOR PRODUCING OF CELLULOSE ESTER FILM

(75) Inventors: Hidekazu Yamazaki, Kanagawa (JP); Toshikazu Nakamura, Kanagawa (JP); Hiroshi Miyachi, Kanagawa (JP)

(73) Assignee: Fujifilm Holdings Corporation, Minami-Ashigara-Shi (JP)

( * ) Notice: Subject to any disclaimer, the term of this patent is extended or adjusted under 35 U.S.C. 154(b) by 41 days.

(21) Appl. No.: 11/061,545

(22) Filed: Feb. 18, 2005

(65) Prior Publication Data

US 2005/0133953 A1 Jun. 23, 2005

Related U.S. Application Data

(62) Division of application No. 10/170,570, filed on Jun. 14, 2002.

(30) Foreign Application Priority Data

Jun. 15, 2001 (JP) ............... 2001-181682
Sep. 10, 2001 (JP) ............... 2001-273461

(51) Int. Cl.
*B29C 39/14* (2006.01)
(52) U.S. Cl. ..................... 264/212; 264/234
(58) Field of Classification Search ............ 264/234, 264/212
See application file for complete search history.

(56) References Cited

U.S. PATENT DOCUMENTS

| 3,112,528 | A | 12/1963 | Czerkas |
| 4,592,885 | A | 6/1986 | Ichino et al. |
| 4,623,501 | A | 11/1986 | Ishizaki |
| 4,863,765 | A | 9/1989 | Ishizuka |
| 5,670,214 | A | 9/1997 | Saito et al. |
| 6,548,117 | B2 | 4/2003 | Tomaru et al. |
| 6,731,357 | B1 * | 5/2004 | Tachibana et al. ............ 349/96 |
| 2002/0050662 | A1 | 5/2002 | Kawabe |
| 2003/0155558 | A1 | 8/2003 | Yamazaki |
| 2003/0215658 | A1 | 11/2003 | Bermel |

FOREIGN PATENT DOCUMENTS

| JP | 2-208650 A | 8/1990 |
| JP | 5-86212 A | 4/1993 |
| JP | 6-134933 A | 5/1994 |
| JP | 2000-19766 A | 1/2000 |

* cited by examiner

*Primary Examiner*—Christina Johnson
*Assistant Examiner*—Monica A Huson
(74) *Attorney, Agent, or Firm*—Birch, Stewart, Kolasch & Birch, LLP (57) ABSTRACT

In order to produce a cellulose ester film constructed of a front layer, an intermittent layer and a rear layer, a dope solution is doped on a supporter. In at least one of the front layer and the rear layer, a mass ratio of a cotton linter to a wood pulp (cotton linter/wood pulp) is between 5/95 and 0/100, and a solvent of the dope contains more than 15 wt. % alcohols and hydrocarbons whose carbon number each is 1–10. Further, a ratio of a solid content density of a solution for forming the front layer and the rear layer to a solid density of a solution for forming the intermittent layer is less than 0.9 wt. %, and a total thickness of the solutions for front and rear layers is more than 5% of the dope ribbon.

19 Claims, 8 Drawing Sheets

METHOD FOR PRODUCING OF CELLULOSE ESTER FILM

This application is a Divisional of co-pending Application Ser. No. 10/170,570, filed on Jun. 14, 2002, and for which priority is claimed under 35 U.S.C. § 120; and this application claims priority of Application No. 2001-181682 filed in Japan on Jun. 15, 2001 and Application No. 2001-273461 filed in Japan on Sep. 10, 2001 under 35 U.S.C. § 119; the entire contents of all are hereby incorporated by reference.

BACKGROUND OF THE INVENTION

1. Field of the Invention

The present invention relates to a method of producing of a cellulose ester film which is used for a deflector protect film and an optical compensation film.

2. Description Related to the Prior Art

A deflector protect film and an optical compensation film are produced of a cellulose ester film, such as cellulose triacetate film (hereinafter TAC film) and the like. The TAC film is produced in a method for producing a film from a solution. In the method additives are solved in a solvent to produce a high molecular solution (dope solution), and thereafter the dope solution is doped on a supporter with a die having a slit, dried for a predetermined time, peeled from the supporter, and further dried again to produce the TAC film.

When the dope solution is dried for a long time thereby, the solvent in the dope solution is evaporated to form a skinning of high molecular material on both edges of the slit of the die. The skinning prevents the doping of the dope solution, and causes the thickness in both edges of the dope solution on the supporter to become uneven. Further sometimes the skinning falls down from the both edges of the slit of the die. In this case, the skinning adheres on a feed roller to damage the TAC film dried from the dope solution on the supporter. In order to prevent the generation of the skinning, U.S. Pat. No. 3,112,528, Japanese Patent Laid-Open Publications No. 2-208650 and 5-86212 describe methods in which the solvent is flown to solve solutes in the dope solution or a mixture of the evaporated solvent and air are blown.

However, in the above methods, the amount of the mixture and the solvent is hardly regulated. Accordingly vibration of edges of a dope ribbon between the die and the supporter causes to generate the skinning.

Further, the deflector protect film is applied to one of both side of a deflector. The deflector is formed of a polyvinylalcohol film (hereinafter PVA film). The PVA film is extended on a shaft for dieing in iodine or to color dyne, and otherwise after dying the PVA film is extended, and bridges with boron compound to produce the deflector.

Several types of the cellulose ester films are proposed. For example, Japanese Patent Laid-Open Publication No. 6-134933 proposes a cellulose triacetate laminate film having a cellulose triacetate film produced from cotton and pulp for easy peeling and improving the heat resistance. Further, Japanese Patent Laid-Open Publication No. 2000-19776 proposes a cellulose ester film whose averaged substitution degree is 2.88–3.00 to always prevent the generation of optical creases.

SUMMARY OF THE INVENTION

An object of the present invention is to provide a method of producing a cellulose ester film, in which the generation of a skinning is prevented.

Another object of the present invention is to provide a method of producing a cellulose ester film used for a deflector protect film and an optical compensation film.

Still another object of the present invention is to provide a method of producing the cellulose ester film used for deflector plate, in which optical non-uniformity does not occur in edges of a corner of a liquid crystal indicator with a deflector to which a deflector protect film is applied.

In order to achieve the objects and other objects, in a method of the present invention for forming the cellulose ester film having front, intermittent and rear layers, the dope solution to be doped on a supporter is composed of a first solution for forming the front layer, a second solution for forming the intermittent layer and the third solution for forming the rear layer. A ratio A/B of a sharing viscosity A of the first or third solution to a sharing viscosity B of the second solution is under 0.9.

Further, in a second embodiment of the method of the present invention, the cellulose ester film is produced by using a die having plural manifolds, and each manifold contains a solutions. The dope solution is composed of the solutions and doped on a supporter. The solvent of the dope solution is alcohol having 1–10 carbons and included 15 wt. % hydrocarbon. The dope solution is dried on the supporter to form the cellulose ester film, and then the cellulose ester film is peeled from the supporter. Thereafter, the cellulose ester film is dried such that in at least one of surface layers of the plural layers a ratio of cotton linter and wood pulp is between 5 to 95 and 0 to 100. In addition, the third solution may be doped so as to contact to the supporter, and the content of alcohol of 1–10 carbon numbers and carbon hydride in a solvent of the third solution may be more than 1% larger than said first and second solutions.

By doping the dope solution, a total thickness of the solutions for the surface layers is more than 5% of the thickness of a dope ribbon. Furthermore, to the dope solution is fed a mixed solvent containing a bad solvent between 30–90% to a solute of the dope solution.

In the third embodiment of the method of the present invention, the die provided with a feed block is used for doping the dope solution to form the cellulose ester film having plural layers. In the forth method of the present invention, plural dies are used for doping the dope solutions so as to form a same number of layer in the cellulose ester film as the dies.

According to the present invention, it is prevented to generate an optical skinning in a corner of a liquid crystal indication device and creases on an end of a slit. Further, the quality of the cellulose ester film becomes higher.

BRIEF DISCRIPTION OF THE DRAWINGS

The above objects and advantages of the present invention will become easily understood by one of ordinary skills in the art when the following detailed description would be read in connection with the accompanying drawings.

PREFERRED EMBODIMENTS OF THE INVENTION

[Polymer]

As high molecular material (polymer) used for a dope solution of the present invention, there are polyamides, polyolefines (for example norbornene polymers and the like), polystyrenes, polycarbonates, polysulfates, polyacrylates, polymehtacrylic acids (for example polymethylmethacrylate and the like), polyetheretherketones, polyvynil alcohols, polyvynil acetates, cellulose derivatives (low fatty acid esters of cellulose and the like). The low fatty acid esters of cellulose (cellulose acylate) are especially preferable.

A low fatty acid of the low fatty acid ester of cellulose has less than 6 carbons. The preferable number of the carbon is 2 (cellulose acetate), 3 (cellulose propionate) or 4 (cellulose butylate). The cellulose acetate is much preferable and the cellulose triacetate (Acetification degree: 58.0–62.5%) is especially preferable. Further a mixture of fatty acid esters may be used, for example, cellulose acetate propionate and cellulose acetate butylate.

[Solvent]

According to solvent, organic solvent is preferable to inorganic one. As the organic solvent, there are hydrocarbon chloride (methylene chloride), ketones (for example acetone, methylethylketone, cycrohexanone and the like), esters (methylfolmate, methyl acetate, ethyl acetate, amyl acetate, butyl acetate and the like), ethers (for example dioxane, dioxorane, tetrahydrofrane, dyethyl ether, methyl-t-butyl ether and the like), aromatic hydrocarbon (for example benzene, toluene, xylene and the like), fatty hydrocarbons (for example hexane and the like), and alcohols (for example methanol, ethanol, n-propyl alcohol, isopropyl alcohol, n-butanol and the like).

The solvent is preferably swollen. Accordingly, the sort of the solvents is determined in accordance with polymers which are used. For example, when as the polymer cellulose triacetate, polycarbonates and polyesters are used, acetone or acetylic acid methyl is used as a preferable solvent. Further, benzene, toluene, xylene, hexane, acetone, methylethylketone are preferably used for norbornen polymers. Furthermore, acetone, methylethylketone, methylacetate, butylacetate or methanol are used for polymethylmethacrylate. Note that more than two kinds of solvents may be mixed and used.

Considering to harmful influences on human bodies and circumstances, materials containing chlorine, such as methylenechloride, may not be used. For producing the dope solution, ketones and alcohols may be mixed. Especially when cellulose acylate is used as polymer, methyl acetylate is preferably used as it easily solves. Further, acetylic acid methyl may more easily solve in mixture of ketones and alcohols. In this case, according to a ratio of each solvent, acetylic acid methyl is 20–90 wt. %, ketones are 50–60 wt. %, and alcohols are 5–30 wt. %.

A boiling point of solvent composing the dope solution is preferably 20–300° C., particulally 30–200° C., especially 40–100° C.

[Additives]

Plasticizer, ultraviolet absorptive material, deterioration inhibitor may be added as the additives to the dope solution.

(Plasticizer)

As the plasticizer used in the present invention, there are phosphoric acid ester plasticizer (for example triphenylphosphate, tricresylphosphate, cresyldiphenyl phosphate, octyldiphenylphosphate, diphenylbiphenyl phosphate, trioctylphosphate, tributylphosphate and the like), phthalic acid ester plasticizer (for example diethylphthalate, dimethoxyethylphthalate, dimethylphthate, dioctylphthalate and the like), grycolic acid ester plasticizer (for example triacetine, tributyline, butylphthalylbutylbricolate, ethylphthalylethylgricolate, methylphthalylethylgricolate, butylphthalylbutylgricolate and the like). Some of the plasticizer may be mixed. Further, other plasticizers described in Japanese Patent Laid-Open Publication No. 11-80381, 11-124445, 11-248940 may be also used. The plasticizers are preferably contained 0.1–20 wt. % to the polymer in the dope solution, particularly 6–16 wt. %.

(Ultraviolet Absorptive Material)

Ultraviolet absorptive materials may be added in the dope solution. Especially the dope solution may contain one or more sorts of ultraviolet absorptive materials. A film produced in a method of the present invention is often used as an optical material for liquid crystal monitor. In this case, the ultraviolet absorptive material should effectively absorb ultraviolet ray under 370 nm of wave length in view of preventing deterioration of the liquid crystal, and hardly absorb visible ray above 400 nm of wave length in view of indication probability of the liquid crystal. For example, there are oxybenzophenone compounds, benzotriazol compounds, salycilic acid ester compounds, bensophenone compounds, cyanoacrilate compounds, nickel complex salt compound, and the like. Particularly preferable are benzotriazol compounds and benzophenone compounds. Especially benzophenone compound hardly makes a unnecessary coloring of the cellulose ester. The benzotriazol ultraviolet compounds include those described in Japanese Patent Laid-Open Publication 8-29619. Further, ultraviolet absorptive materials already known, such as described in Japanese Patent Laid-Open Publication No. 8-23950, may be also used. The ultraviolet absorptive material is preferably contained in 0.001–5 wt. %.

As the preferable ultraviolet absorptive material, there are, for example, 2,6-di-tert-butyl-p-crezol, pentaerythrityl-tetrakis[3-(3,5-di-tert-butyl-4-hydroxyphenyl) propionate], triethylenegrycol-bis[3-(3-tert-butyl-5-methyl-4-hydroxyphenyl) propionate], 1,6-hexanediol-bis[3-3,5-di-tert-butyl-4-hydroxyphenyl propionate], 2,4-bis-(n-octylthio)-6-(4-hydroxy-3,5-di-tert-butylanilino) 1,3,5-triazine, 2,2-thio-diethylene-bis[3 -(3,5-di-tert-butyl-4-hydrozypheny) propionate, Octadecyl-3-(3,5-di-tert-butyl-4-hydroxyphenyl) propionate, N,N'-hexamethylenebis(3,5-di-tert-butyl-4-hydroxy-hydrocynenamide), 1,3,5-trimethyl-2,4,6-tris(3,5-di-tert-butyl-4-hydrozybenzil) benzene, tris-(3,5-di-tert-butyl-4-hydroxybenzil)-isocianulate.

Especially preferable are 2,6-di-tert-butyl-p-crezol, pentaerythrytyl-tetrakis[3-(3,5-di-tert-butyl-4-hydroxyphen yl)propionate], triethyleneglycol-bis[3-(3-tert-butyl-5-methyl-4-hydroxyphe nyl)propionate]. Metal deactivators of hydradine compounds, for example, N,N'-bis[3-(3,5-di-tert-butyl-4-hydroxyphenyl) propionyl]hydradine, and phosphate processing stabilizer, such as tris(2,4-di-tert-butylphenyl)phosphite may be mixed and used. Such compounds are preferably contained in 0.001–5 wt. % to the polymer in the dope solution.

(Particle Powders)

The dope solution preferably contains mat materials of particle powders for improving an adhering endurance property under high moisture of the film. A height of protrusions on a surface of the mat material is preferably 0.005–10 μm, particularly 0.01–5 μm. The number of the protrusions is preferably large. However, when it is larger than necessary, the protrusions cause to generate haze. The mat materials may be inorganic and organic and may be sometimes formed in ball-shape in spray-dry method or diffusing method. As inorganic mat materials, there are barium sulfate, manganese colloid, titanium dioxide, barium strontium sulfate, silicon dioxide, aluminum oxide, zinc oxide, tin oxide, calcium carbonate, talc, caoline, calcium sulfate. Further, there are silicone dioxide, (for example synthetic silica obtained by gelating silicic acid of in wet processing) and titanium dioxide produced from titanslag and sulfuric acid. The inorganic mat material may be obtained also by milling inorganic compound whose diameter is more than 20 mm. Thereafter, the classification of inorganic compound is carried out for example by (vibrating filtration, wind power classification).

As the organic compound, there are polytetrafluoroethylene, cellulose acetate, polystyrene, polymethylmethacrilate, polypropylmethacrilate, polymethyl acrilate, polyethylene carbonate, acrylstyrene resins, silicone resins, polycarbonate resins, benzoguanamine resins, melanine resins, polyolefin resins, polyamide resins, polyimide resins, polyfluoroethylene resins and starch. There are further high molecular compound synthesized in suspension polymerization. However, when the amount of the particle powders is too large in the dope solution, the resiliency of the film becomes lower. Accordingly, the dope solution preferably contain the particle powders in 0.001–5 wt. % to the polymer.

[Fluoride Surface-Active Agent]

In the dope solution, fluoride surface-active agents may be also added. The fluoride surface-active agents have a hydrophobic group of fluorocarbon chain, and is used as coating agent in organic solvent or a antistatic agent while it decreases a surface tension. As the fluoride surface-active agent there are, for example, $C_8F_{17}CH_2CH_2O$—$(CH_2CH_2O)_{10}$—$OSO_3Na$, $C_8F_{17}SO_2N(C_3H_7)$ $(CH_2CH_2O)_{16}$—H, $C_8H_{17}SO_2N(C_3H_7)CH_2COOK$, $C_7F_{15}COONH_4$, $C_8H_{17}SO_2N(C_3H_7)CH_2CH_2O)_4$—$(CH_2)_4$—$SO_3Na$, $C^8H_{17}SO_2N(C_3H_7)(CH_2)_3$—$N^+(CH_3)_3I^-$, $^C_8F_{17}SO_2N(C_3H_7)CH_2CH_2CH_2N^+(CH_3)_2$—$CH_2COO^-$, $C_8F_{17}CH_2CH_2O$ $(CH_2CH_2O)_{16}$—H, $C_8F_{17}CH_2CH_2O(CH_2)_3$—$N^+(CH_3)_3I^-$, $H(CF_2)_8$—$CH_2CH_2OCOCH_2CH(SO_3)COOCH_2CH_2CH_2$—$(CF_2)_8$—H, $H(CF_2)_6CH_2CH_2(CH_2CH_2O)_{16}$—H, $H(CF_2)_8CH_2CH_2OCOCH_2CH(SO_3)COOCH_2CH_2CH_2CH_2C_8F_{17}$, $C_9F_{17}$—$C_6H_4$—$SO_2N(C_3H_7)(CH_2CH_2O)_{16}$—H, $C_9F_{17}$—$C_6H_4$—$CSO_2N(C_3H_7)(CH_2)C$—$N^+(CH_3)_3I^-$.

The amount of the fluoride surface active agent in the dope solution is preferably 0.001–2 wt. % to the polymer.

Further, in the dope solution, several sorts of the additives may be added to the solution. As the additives there are thermostabilizer, antistatic agent, flame retardant, lubricant, oils and the like that are for example salt of alkali earth metal such as calcium and magnesium.

[Mold Releasing Agent]

In the dope solution, a mold releasing agent may be added. The dope solution is doped on a supporter and dried thereon to the film. By adding the mold releasing agent, the film may be easily peeled from the supporter. As the mold releasing agent, there are waxes having high melting point, high fatty acid, salts and esters thereof, silicone oil, polyvinyl alcohol, low molecular polyethylene, plant protein derivatives and the like. The amount of the molding releasing agent is preferably 0.002–2 wt. % to the polymer in the dope solution not so as to harmfully influence on luster and smoothness of the surface of the film.

[Mold Releasing Accelerator]

In the dope solution, a mold releasing accelerator may be added. As the mold releasing accelerator, surface-active agents are especially preferable, and described in Japanese Patent Laid-Open Publication No. 61-243837. There are phosphorus type, carbon type, nonionic type, cationic type and the like in the surface active agent. The amount of the molding releasing accelerator is 0.002–2 wt. %, preferably 0.005–1 wt. %, especially 0.01–0.5 wt. %.

The mold releasing accelerators are described as follows:

$(R_1$—$B_1$—$O)_{n1}$—$P(=O)$—$(OM_1)_{n2}$  Formula (1)

$R_2$—$B_2$—$X$  Formula (2)

Herein $R_1$ and $R_2$ are alkyl group, alkenyl group, alarkyl group and aryl group; $M_1$ is alkali earth metal, ammonia, lower alkylamine. B1 and B2 are coupling group of two valencies; X is carbonic acid (or salt thereof), sulfenic acid (or salt thereof) and sulfuric acid ester (or salt thereof). n1 is the number of "1" or "2", and n2 is integer of (3–n1).

Preferable examples of $R_1$ and $R_2$ are non-substituted alkyl group which has 4–40 carbons (butyl, hexyl, octyl, 2-ethylhexyl, nonyl, dodecyl, hexadecyl, octadecyl, eicosanyl, docosanyl, myricyl and the like), non-substituted alkenyl group which has 4–40 carbons (2-hexenyl, 9-decenyl, oleyl and the like), substituted and non-substituted aryl group which has 4–40 carbons (phenyl, naphtyl, methylphenyl, dimethylphenyl, trimethylphenyl, ethylphenyl, propylphenyl, di-isopropylphenyl, tri-isopropylphenyl, t-butylphenyl, di-t-butylphenyl, tri-t-butylphenyl, isopentylphenyl, ectylphenyl, isooctylphenyl, isononylphenyl, diisononylphenyl, dodecylphenyl, isopentadecylphenyl and the like).

Especially preferable are hexyl, octyl, 2-ethylhexyl, nonyl, dodecyl, hexadecyl, octadecyl, docosanyl, alkenyl, phenyl, naphtyl, tri-methylphenyl, di-isopropylphenyl, tri-isopropylphenyl, di-t-butylphenyl, tri-t-butylphenyl, isooctylphenyl, isononylphenyl, di-isononylphenyl and dodecylisonetadecylphenyl.

$B_1$ and $B_2$ are alkylene having 1–10 carbons, polyoxiethylene (degree of polymerization: 1–50), polyoxipropylene (degree of polymerization: 1–50), polyoxiglycerin and a mixture thereof. Preferable examples of $B_1$ and $B_2$ are methylene, ethylene, propylene, butylenes, polyoxiethylene (degree of polymerization: 1–25), polyoxipropylen (degree of polymerization: 1–25), polyoxiglicerin (degree of polymerization: 1–15). Preferable examples of X are sulfonic acid, sulfuric acid ester, and their salt with Na, K, ammonium, trimethylamine and triethanolamine.

The preferable embodiments of the mold releasing accelerators are represented in the following formulas:

RZ-1: $C_8H_{17}O—P(=O)—(OH)_2$
RZ-2: $C_{12}H_{25}O—P(=O)—(OK)_2$
RZ-3: $C_{12}H_{25}OCH_2CH_2O—P(=O)—(OK)_2$
RZ-4: $C_{15}H_{31}(OCH_2CH_2)_5O—P(=O)—(OK)_2$
RZ-5: $\{C_{12}H_{25}O(CH_2CH_2O)_5\}_2—P(=O)—OH$
RZ-6: $\{C_{18}H_{35}(OCH_2CH_2)_8O\}_2—P(=O)ONH_4$
RZ-7: $(t-C_4H_9)_3—C_6H_2—OCH_2CH_2O—P(=O)—(OK)_2$
RZ-8: $(iso-C_9H_{19}—C_6H_4—O—(CH_2CH_2O)_5—P(=O)—(OK)OH$
RZ-9: $C_{12}H_{25}SO_3Na$
RZ-10: $C_{12}H_{25}OSO_3Na$
RZ-11: $C_{17}H_{33}COOH$
RZ-12: $C_{17}H_{33}COOH.N(CH_2CH_2OH)_3$
RZ-13: $iso-C_8H_{17}—C_6H_4—O—(CH_2CH_2O)_3—(CH_2)_2SO_3Na$
RZ-14: $(iso-C_9H_{19})_2C_6H_3—O—(CH_2CH_2O)_3—(CH_2)_4SO_3Na$
RZ-15: sodium triisopropylnaphthalenesulfonate
RZ-16: sodium tri-t-butylnaphthalenesulfonate
RZ-17: $C_{17}H_{33}CON(CH3)CH_2CH_2SO_3Na$
RZ-18: $C_{12}H_{25}—C_6H_4SO_3.NH_4$ Further, Japanese Patent Laid-Open Publication No. 10-316701 describes acids and salts thereof as the preferable examples of the mold releasing accelerator. Acid dissociaion constant pKa of the acids and salts is 1.93–4.50, preferably 2.0–4.4, particularly 2.2–4.3 and especially 2.6–4.3.

The acid may be organic or inorganic acid. As the inorganic acid, there are, for example, $HClO_2$ (2.31), HOCH (3.48), Molybdic acid ($H_2$, $MoO_4$: 3.62), $HNO_2$, (3.15), phosphoric acid ($H_3$, $PO_4$: 2.15), tri-polyphosphoric acid ($H_5$, $P_3$, $O_{10}$: 2.0), vanadic acid ($H_3$, $VO_4$: 3.78) and the like. As the organic acid, there are fat group monocarbonic acids, such as formic acid (3.55), oxaluric acid (2.27), cyanoacetic acid (2.47), phenylacetic acid (4.10), phenoxyacetic acid (2.99), fluoroacetic acid (2.59), chloroacetic acid (2.69), bromoacetic acid (2.72), iodoacetic acid (2.98), mercaptoacetic acid (3.43), vinylacetic acid (4.12), chloropropionic acid (2.71–3.92), 4-aminobutyric acid (4.03) and acrylic acid (4.26). High fatty carbonic acids may be also used, for example, malonic acid (2.65), succinic acid (4.00), glutaric acid (4.13), adipic acid (4.26), pimelic acid (4.31), azelatic acid (4.39), fumalic acid (2.85), grycolic acid (3.63), lactic acid (3.66), malic acid (3.24), tartaric acid (2.82–2.99), citric acid (2.87) and the like. There are further glyoxylic acid (3.18), pyrvic acid (2.26), levulinic acid (4.44), anilinesulfonic acid (3.74–3.23), benzoicacid (4.20), aminobenzoic acid (2.02–3.12), chlorobenzoic acid (2.92–3.99), cyanobenzoic acid (3.60–3.55), nitrobenzoic acid ((2.17–3.45), hydroxybenzoic acid (4.08–4.58), anisic acid (4.09–4.48), fluorobenzoic acid (3.27–4.14), bromobenzoic acid (2.85–4.00), iodobenzoic acid (2.86–4.00), salicylic acid (2.81), naphtoic acid (3.70–4.16), cinnamic acid (3.88), mandelic acid (3.19), phthalic acid (2.75), isophthalic acid (3.50), telephthalic acid (3.54), nicotinic acid (2.05), 2-furancarboxylic acid (2.97), 2,6-pyridinecarboxylic acid (2.09) and the like.

As the mold releasing accelerator there are amino acids, such as asparatgine (2.14), aspartic acid (1.93), adenine (4.07), alanine (2.30), b-alanine (3.53), arginine (2.05), isoleucine (2.32), glycine (2.36), glutamine (2.17), glutamic acid (2.18), serine (2.13), tyrosine (2.17), tryptophane (2.35), threonine (2.21), norleucine (2.30), valine (2.26), phenylalanine (2.26), methionine (2.15), lysine (2.04) and leucine (2.35). There are also amino acid derivatives, such as adenosine (3.50), adenosine triphosphate (4.06), adenosine phosphate (3.65–3.80), L-alanyl-L-alanine (3.20), L-alanylglycine (3.10), b-alanylglycine (3.18), L-alanylglycyrglycine (3.24), b-alanylglycyrglycine (3.19), L-alanylglycyrglycyrglycine (3.18), glycyr-L-alanine (3.07), glycyr-b-alanine (3.91), glycyrglycyr-L-alanine (3.18), glycyrglycyrglycine (3.20), glycyrglycyrglycyrglycine (3.18), glycyrglycyr-L-histidine (2.72), glycyrglycyrglycyr-L-histidine (2.90), glycyr-DL-histidylglycine (3.26), glycyr-L-histidine (2.54), glycyr-L-leucine (3.09), g-L-glutamine-L-cicteinylglycine (2.03), N-methylglycine (sarcosine: 2.20), N,N-dimethylglycine (2.08), cytllurine (2.43), 3,4-dihydroxiphenylalanine (2.31), L-histidilglycine (2.84), L-phenylalanilglycine (3.02), L-propylglycine (3.07), L-leucil-L-tyrosine (3.15).

Preferable are formic acid, chloroacetic acid, haloacetic acid, halopropionic acid, acrylic acid, moronic acid, succinic acid, glutaric acid, fumalic acid, glycolic acid, lactic acid, malic acid, tartaric acid and citric acid.

These acids may be used as free acid, and their salts with alkali metal, alkali earth metal and heavy metal. As alkali metal, there are lithium, potassium, and preferably sodium. As alkali earth metal, there are barium, strontium, preferably calcium, magnesium. As heavy metal there are zinc, tin, nickel and iron. Note that one or more than two sorts of the metals may be used.

In 1 g of cellulose ester, the acid and the salt thereof may be $1\times10^{-9}$–$3\times10^{-5}$ mol, preferably $1\times10^{-8}$–$2\times10^{-5}$, particularly $1\times10^{-7}$–$1\times10^{-5}$, and usually $5\times10^{-7}$–$5\times10^{-6}$. The amount of the acids and salts in the cellulose esters may be determined with ionchromatography analysis.

[Ionchromatography Analysis]

2.0 g of powders of dried cellulose acetate is measured. Hot water 80 ml is added to the cellulose acetate to produce a mixture of the hot water and the cellulose acetate. The mixture is agitated and left for a night in a tightly closed case. Thereafter, the mixture is agitated again and left for a while. Then the uppermost solution is obtained as a sample solution.

Note that the alkali metal and the alkali earth metal, if their amount in the solution is not large, may be bound with acid group of the cellulose acetate. Total amount of alkali metal and alkali earth metal in cellulose acetate 1 g is determined not so as to have a bad influence on heat resistance stabilization. Namely, the total amount is, in ion equivalent amount, less than $5.5\times10^{-6}$, preferably $3.5\times10^{-6}$, particularly $2.5\times10^{-6}$. Especially, the total amount is less than $1\times10^{-6}$, more especially less than $0.3\times10^{-6}$. In this case, when the film is half-dried, the film is easily peeled from the supporter without damage. The amount of the alkali metal and alkali earth metal is determined with atomic absorption analysis.

The mold releasing accelerators (1) and (2) are produced by mixing cellulose acetate with acids and salts of acid dissociation constant pKa. Thereby the acids and the salts may be processed with the cellulose acetate during or after a process, such as a producing process of the cellulose acetate. The powdered or flaked cellulose acetate is cleansed or dipped in water or a solution. Further, the acids and the salts may be added in the dope containing the cellulose acetate. The processing the cellulose acetate with the acids and the salts are preferably carried out in 10–70° C., preferably 15–50° C., for 1 minute–12 hours. Thus the cellulose acetate can continuously have at least a carboxylic group even after the processing.

A method of producing a film from the cellulose ester is explained now.

Figure 1:
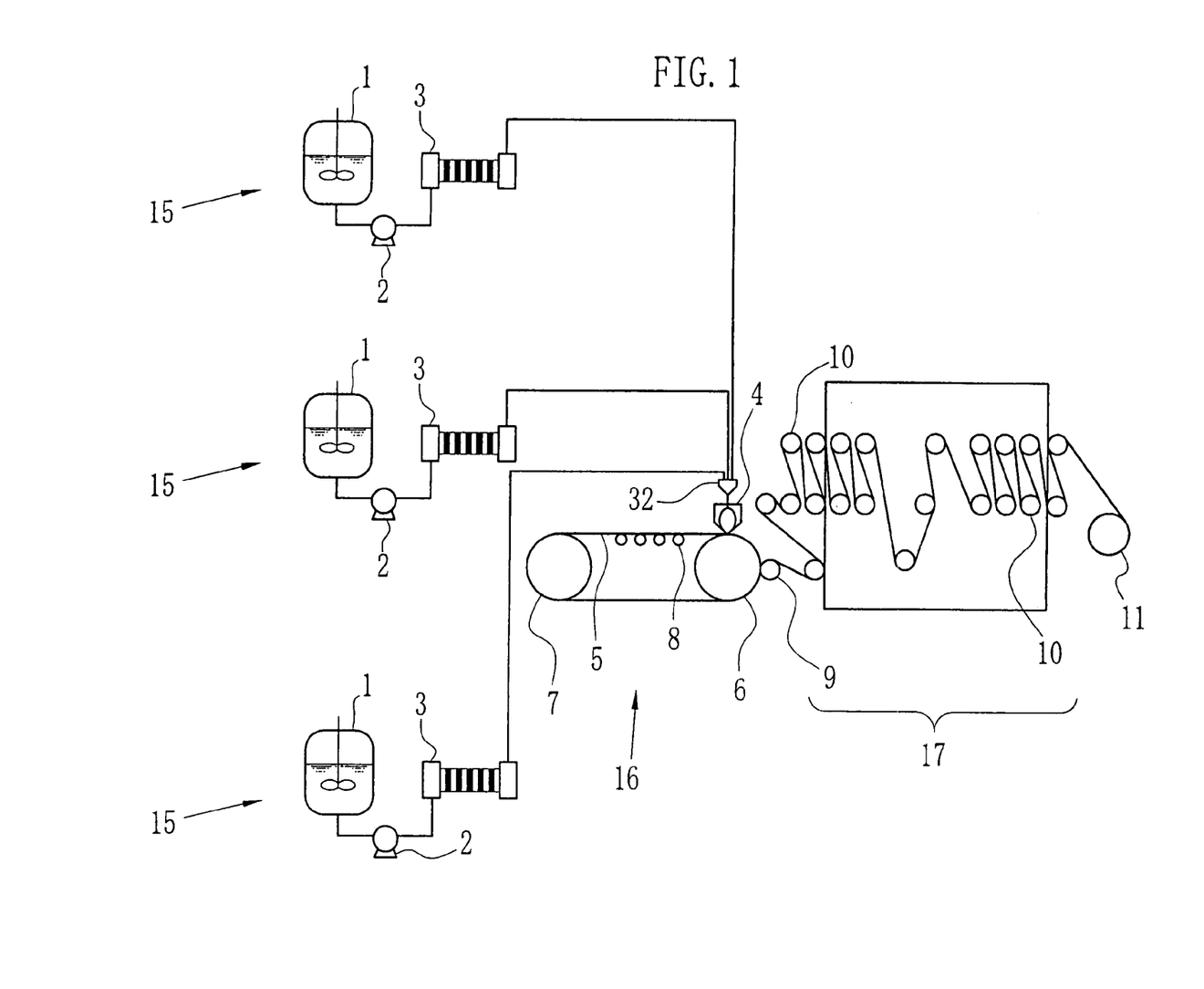
FIG. 1 is a schematic diagram of a device for producing a cellulose ester film.

In FIG. 1, there are three dope preparing sections 15. each of the dope preparing section 15 has a mixing tank 1, a feed pump 2 and a filter 3. The mixing tank 1 is used for preparing the dope. In the mixing tank 1, the cellulose triacetate and the additives are mixed. The mixing tank 1 is connected through the feed pump 2, the filter 3 and a feed block 32 to a die 4 of a doping section 16. The doping section 16 is constructed of the die 4, a supporter a rotary drums 6, 7 and plural guide rollers 8. Below the die 4, the rotary drums 6,7 and a belt 5 are disposed. The belt 5 is used as the supporter, and is extendedly set the rotary drums 6, 7 so as to confront to the die 4. From the die 4 the dope solution is provided on the belt 5. Further, above and below the belt 5, a dried air blow supplier (not shown) is provided that is used for drying the dope solution on the belt 5. Thus the dope solution dried to become the film.

The rotary drum 6 is confronted to a peeling roller 9 of a drying section 17. The film is peeled from the supporter by the peeling roller 9. The drying section has further guide rollers 10 and a drying room 12. In the drying section the film is perfectly dried and thereafter wound on a winding roller 11.

Before forming the film, the solvent evaporates. If P and Q are determined as weights of the dried film and the solvents respectively, the remain-evaporate ratio of the film is represented in R=(Q/P)×100. The remain-evaporate ratio R is preferably more than 120%, and particularly 200%. Further, the film may be dried after remove from the supporter.

When the remain-evaporate ratio R is less than 120 wt. %, only one of the surfaces of the film is dried, and the film is hardly wound. Therefore, before winding, the film is dried again.

Further, it is preferably to carry out the nailing in the film and cut down edges of the film before winding.

Figure 2A:
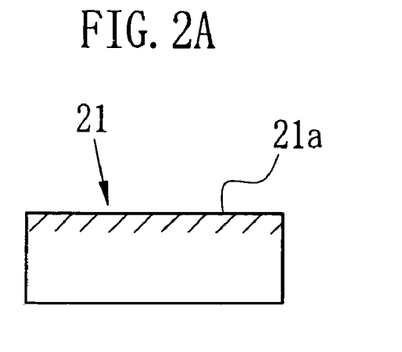
FIG. 2A is a sectional view of the cellulose ester film.
Figure 2B:
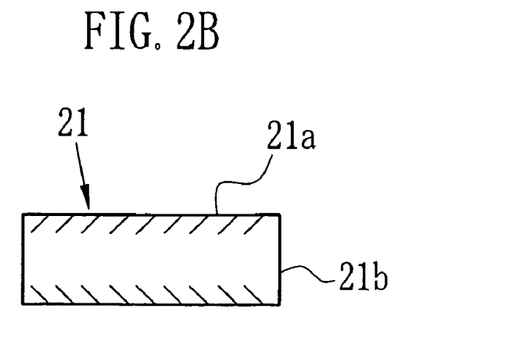
FIG. 2B is a sectional view of the cellulose ester film.

In FIG. 2A, a film 21 has an outer part 21a which is made from a solution containing cotton linter and wood pulp in ratio (cotton linter/wood pulp) 5/95–0/100. The solution contains as its solvent more than 15 wt. % alcohol and hydrocarbons whose number of carbon is 1–10. In FIG. 2B, a film 21 further has an outer part 21b which is made from a solution containing cotton linter and wood pulp in ratio (cotton linter/wood pulp) 5/95–0/100. The solution contains as its solvent more than 15 wt. % alcohol and hydrocarbons whose number of carbon is 1–10.

Figure 3A:
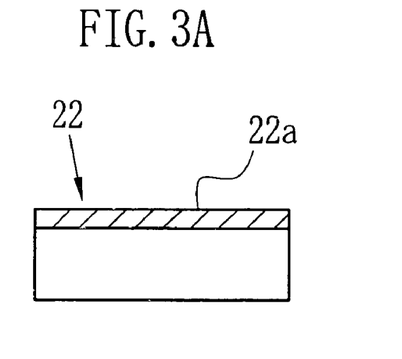
FIG. 3A is a sectional view of the cellulose ester film having a surface layer.
Figure 3B:
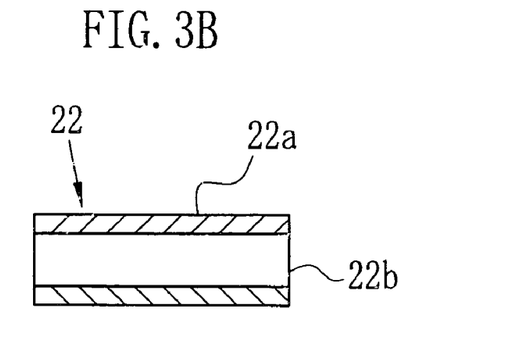
FIG. 3B is a sectional view of the cellulose ester film having two surface layers.

In FIG. 3A, a film 22 has a two-layers structure. A surface layer 22a of the film 22 is made from a solution containing cotton linter and wood pulp in ratio (cotton linter/wood pulp) 5/95–0/100. The solution contains as its solvent more than 15 wt. % of alcohol and hydrocarbons whose number of carbon is 1–10. In FIG. 3B, a film 22 has a three layer structure. A surface layer 22b of the film 22 is made from a solution containing cotton linter and wood pulp in ratio (cotton linter/wood pulp) 5/95–0/100. The solution contains as its solvent more than 15 wt. % alcohol and hydrocarbons whose number of carbon is 1–10.

Note that the present invention is not restricted in the embodiment illustrated in FIGS. 2A, 2B, 3A and 3B, and may have four layer structure, for example.

Figure 4:
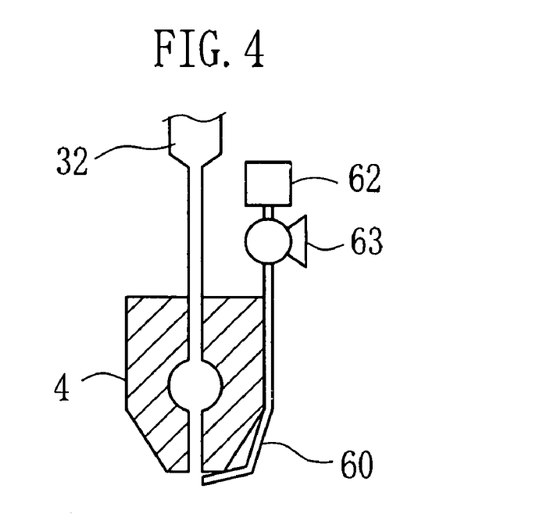
FIG. 4 is a side view of a die and a feed block.

In FIG. 4, the die 4 is provided with a nozzle 60, vessel 62 and a pump 63. The vessel 62 contains a mixture solvent (not shown) of good and bad solvents of cellulose triacetate. The mixture solvent is fed out through the nozzle 60 by the pump 63.

Figure 5A:
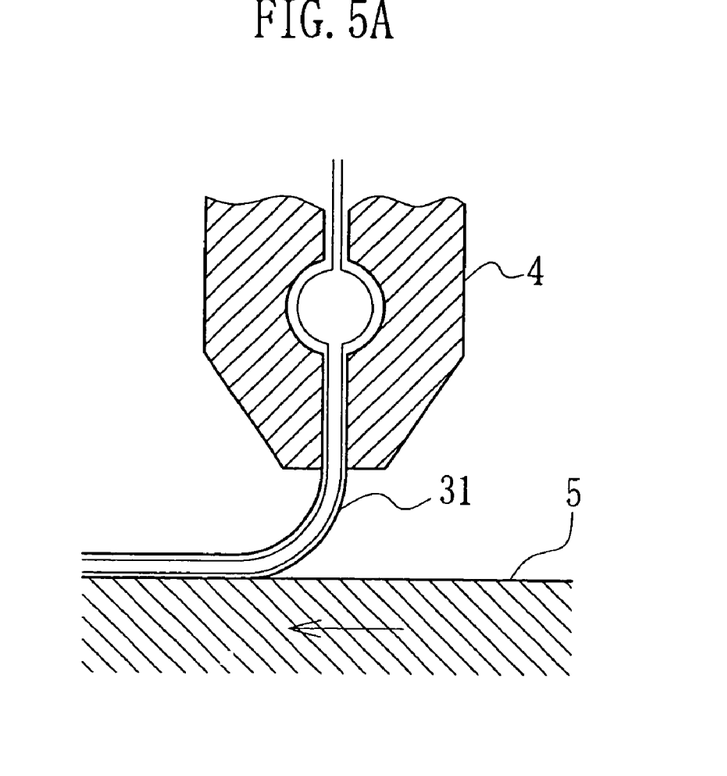
FIG. 5A is a sectional view of a part of the die in a situation of doping a dope solution.
Figure 5B:
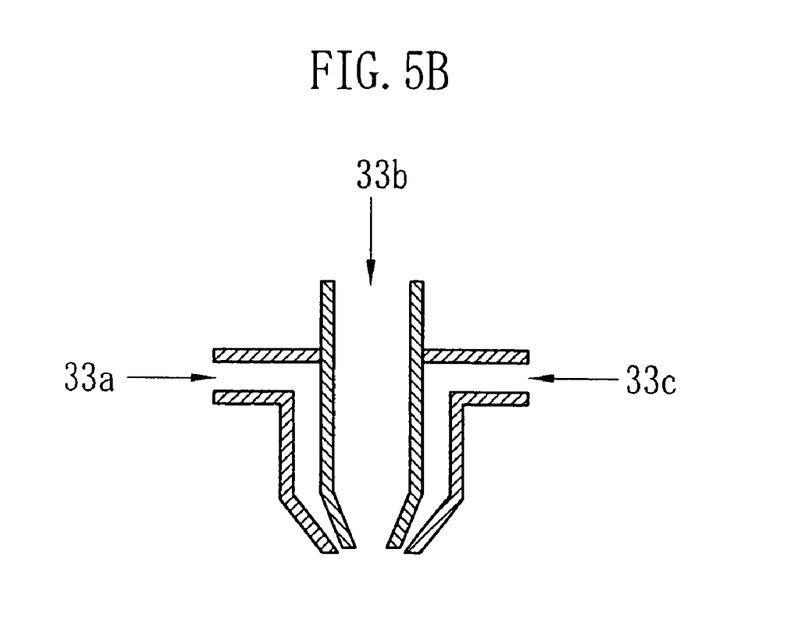
FIG. 5B is a schematic sectional view of the feed block.

In FIG. 5A, the die 4 is a feed block type. The supporter 33 moves at a predetermined speed in an arrowed direction, and the die 4 dopes the dope solution as a dope ribbon 31 on the belt 5. As shown in FIG. 5B, the feed block 32 is supplied with solutions 33a, 33b, 33c, and has a structure to superpose them. Accordingly, the dope ribbon 31 has a three-layers structure.

The solutions 33a, 33c are mixed with the mixture solvent fed out from the nozzle 60. Accordingly the dope ribbon 31 does not vibrate and edges of the dope ribbon become stable. As the bad solution there are methanol, n-butanol and the like, and as the good solution there are methylene chloride, methylacetate, and the like. Further, the solid content density of the solutions 33a and 33c becomes lower to prevent the skinning in the edges of the film.

Figure 6A:
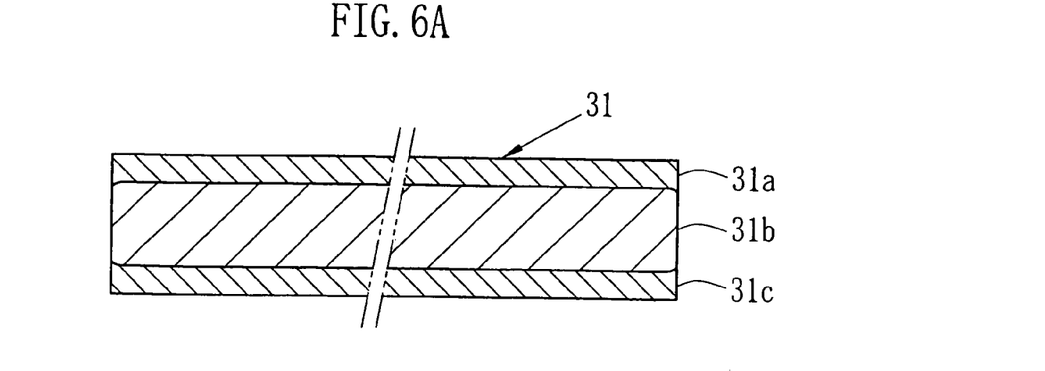
FIG. 6A is a sectional view of a dope ribbon.
Figure 6B:
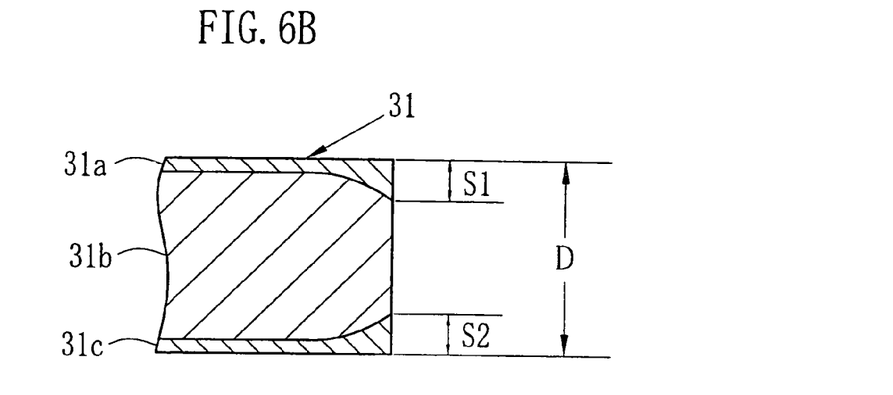
FIG. 6B is an exploded sectional view of an edge of the dope ribbon.

As shown in FIG. 6A, the dope ribbon 31 is constructed of a first layer 31a, a second layer 31b and a third layer 31c. The second layer 31b is sandwitched by the first and second layer 31a, 31c. As shown in FIG. 6B, in an edge of the dope ribbon 31 the first layer 31a and third layer 31c becomes thicker. When D, S1 and S2 are determined as thickness of the dope ribbon 31, the first layer 31a and the third layers 31c respectively, the following formula should be satisfied:

$$(S1+S2)D \times 100 > 5 \ (\%)$$

Figure 7:
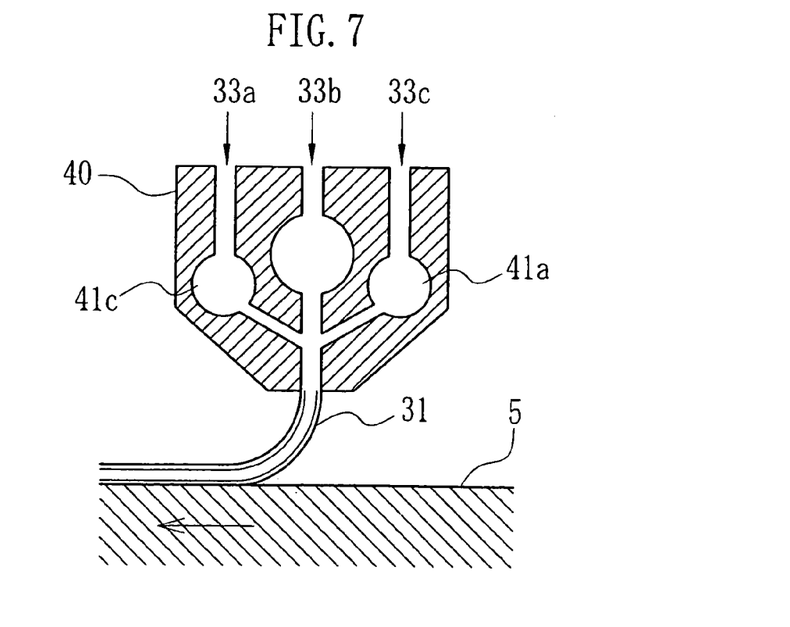
FIG. 7 is an exploded sectional view of a die having three manifolds.

In FIG. 7, a die 40 may have three manifolds 41a, 41b, 41c. The manifolds 41a, 41b, 41c are provided with solutions 33a, 33b, 33c respectively, and in the die 40 the three layer dope 31 is constructed.

Note that a solid content density of the solutions 33a, 33c constructing outer sides of the three layer dope 31 is preferably by 0.5% lower than that of the solution 33b constructing a core layer of the three layer dope 31. Otherwise, the film may have slight projections or retractions on a surface thereof to cause damages in the edges of the film.

In the present invention, the alcohols and hydrocarbons having 1–10 carbons are preferably contained more by 1 wt. %, particularly by 2 wt. % in the solution 33c than in the solutions 33a, 33b. Otherwise, it becomes hard to peel the film from the belt 5.

The temperature of a surface of the belt 5 is preferably between −20° C. and 25° C., particularly between −10° C. and 15° C. When the temperature of the surface is below −20° C., a gas solidalization often occurs to damage the surface of the film. When the temperature of the surface is over 25° C., bubbles often generate and the film easily sticks on the belt 5 to cause the forming of slight projections and retractions.

Figure 8:
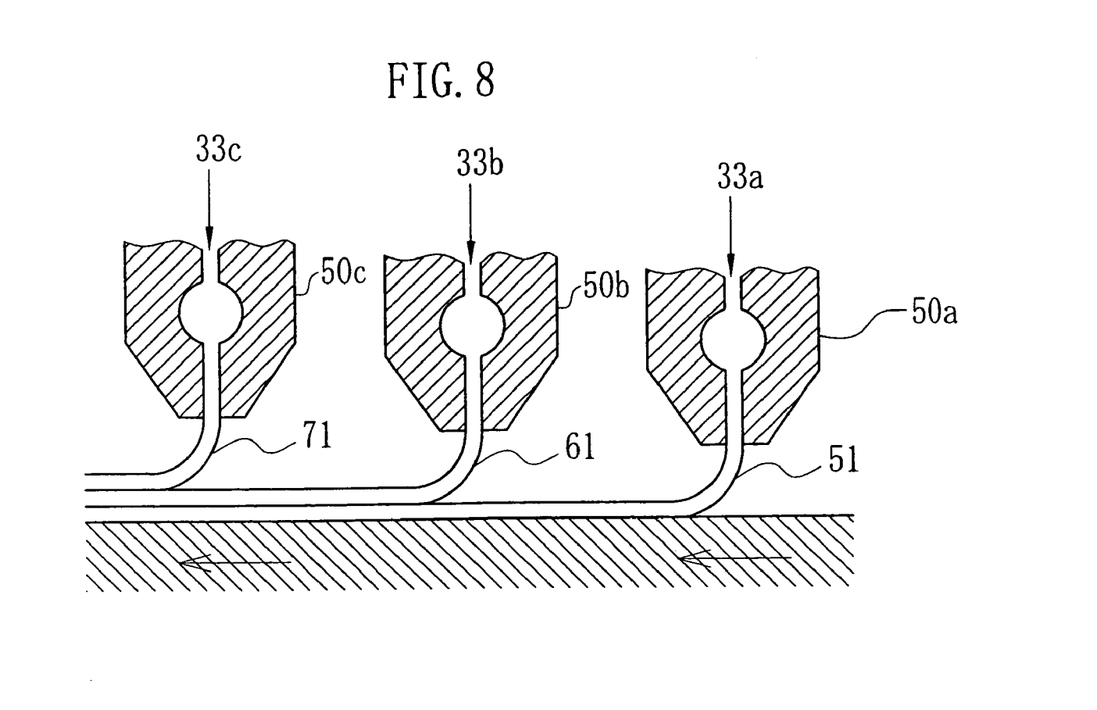
FIG. 8 is an exploded sectional view of three dies.

In FIG. 8, three dies 50a, 50b, 50c may be used. The three dies 50a, 50b, 50c are supplied with the solutions 33a, 33b, 33c to dope them on the supporter respectively. Thus the solution 33a lies on the belt 5, the solution 33a lies uppermost, and the solution 33c is sandwitched between the solutions 33a and 33c.

Figure 9:
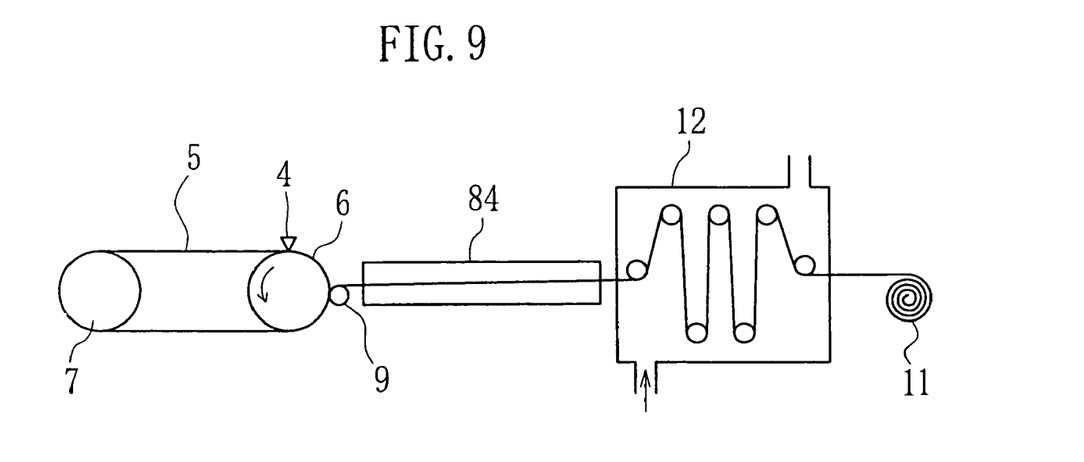
FIG. 9 is a schematic view of a doping section and a drying section of the second embodiment.

In FIG. 9, the drying section 17 is further provided with a tenter 84 between the peeling roller 9 and the drying chamber 12. By the tenter 84, the film is stretched and dried.

Figure 10:
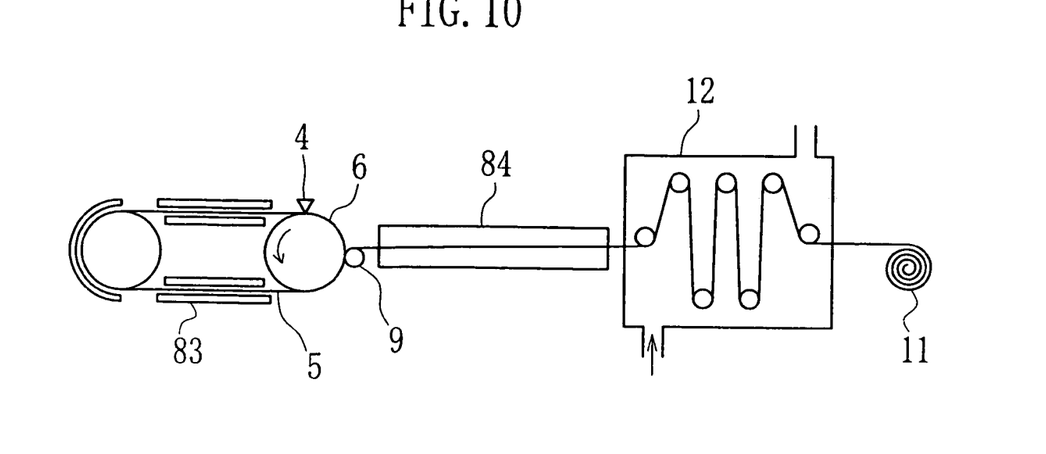
FIG. 10 is a schematic view of a doping section and a drying section of the third embodiment.
Figure 11:
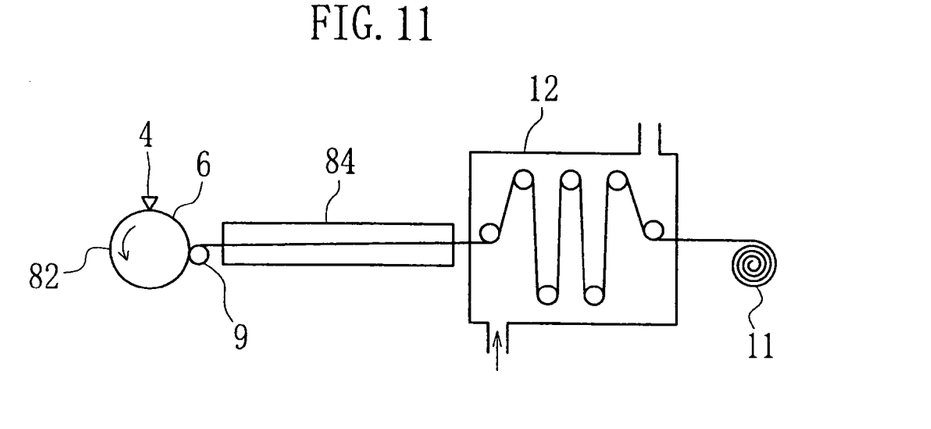
FIG. 11 is a schematic view of a doping section and a drying section of the forth embodiment.
Figure 15:
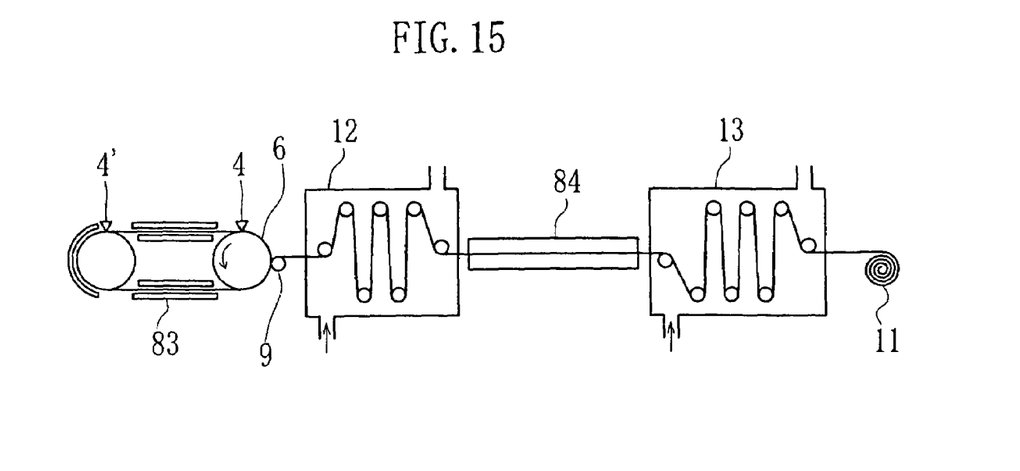
FIG. 15 is a schematic view of a doping section and a drying section of the eighth embodiment.

As shown in FIG. 10, heater plates are provided above and below the belt 5 to effectively dry the dope. Further, in FIG. 15 a drum 82 is used as the supporter.

Figure 12:
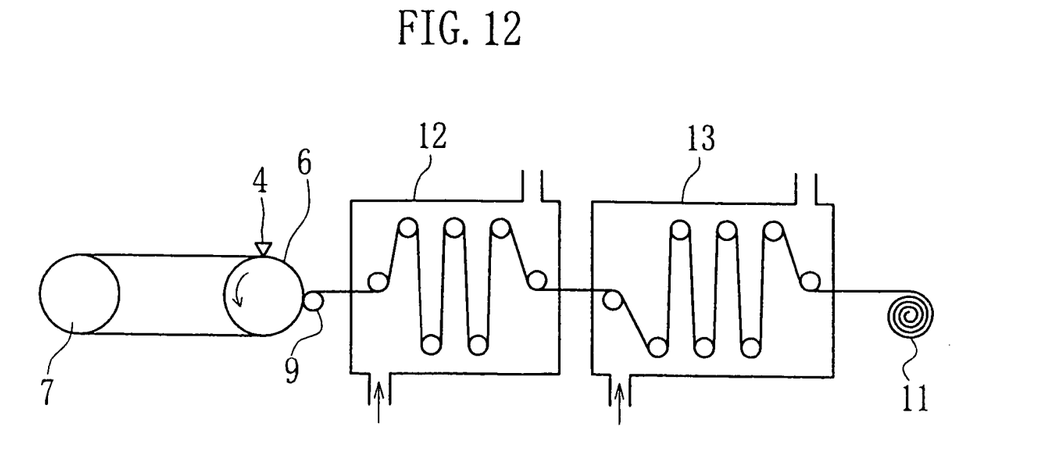
FIG. 12 is a schematic view of a doping section and a drying section of the fifth embodiment.
Figure 13:
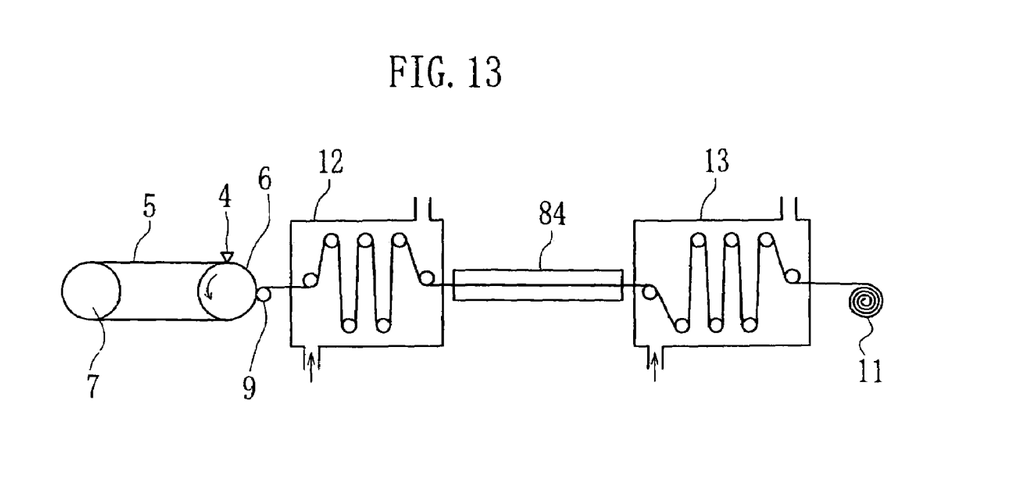
FIG. 13 is a schematic view of a doping section and a drying section of the sixth embodiment.
Figure 14:
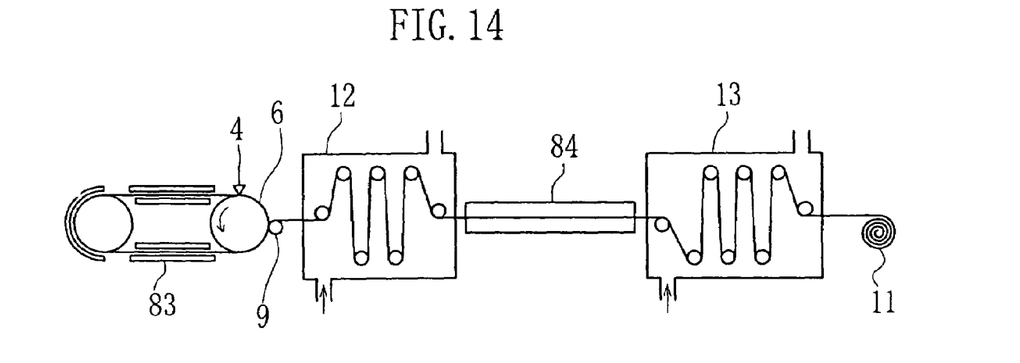
FIG. 14 is a schematic view of a doping section and a drying section of the seventh embodiment.
Figure 16:
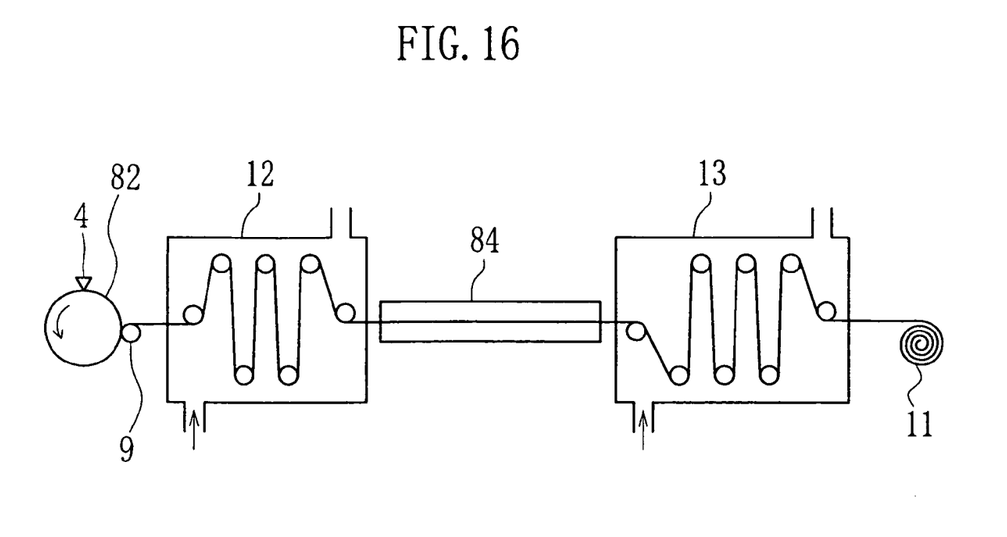
FIG. 16 is a schematic view of a doping section and a drying section of the ninth embodiment.
Figure 17:
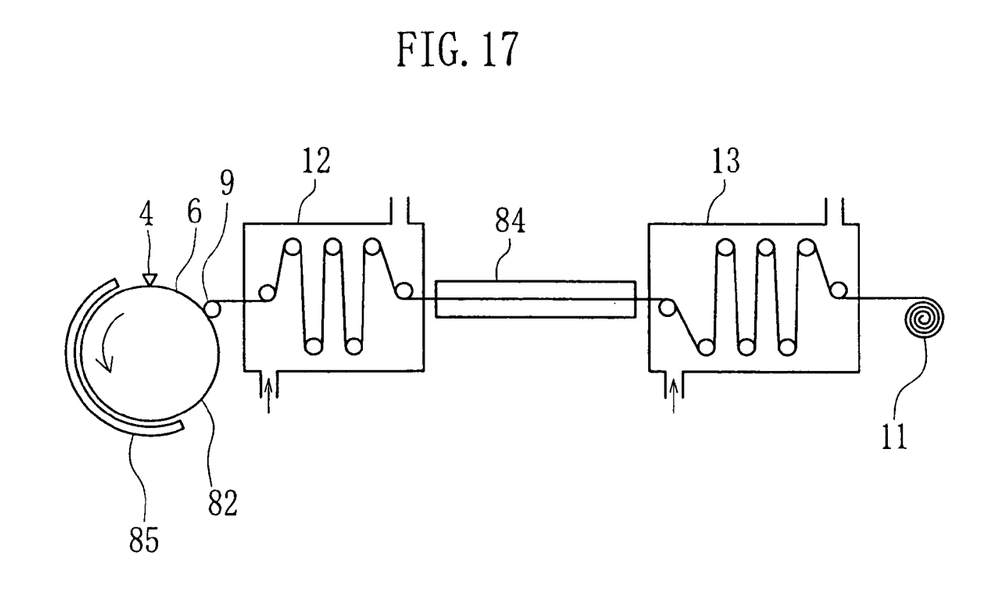
FIG. 17 is a schematic view of a doping section and a drying section of the tenth embodiment.

In FIG. 12, the drying section has a drying chamber 13 too. As shown in FIG. 13, the tenter 84 may be disposed between the drying chambers 12, 13. In FIG. 14 the heater plates 83 are disposed above and below the belt 5, and in FIG. 15 a die 85 is provided so as to confront to the drum 7. In FIG. 16 the drum 82 is used as the supporter, and in FIG. 17, a heater 85 is provided so as to confront to the drum 82.

A method of producing the film from the cellulose ester is not restricted in them. For example the die 4 may be provided with a pressure reduction chamber.

[Preparation of Solutions Constructing Dope Solution]

Preparation of solutions is explained as an example in which cellulose triacetate is used as the polymer.

In the dope ribbon 31, the solid content density of the solution 33b for the intermittent layer 31b in the dope ribbon 31 is preferably 15–30 wt. %, especially 18–27 wt. %, and that of the solutions 33a, 33c for the front and rear layers 31a, 31c is preferably 10–25 wt. %, especially 13–22 wt. %.

(Swelling Process)

Cellulose triacetate particles and solvents are mixed to produce a mixed solution. Thereafter, the cellulose triacetate particles are swollen in the solvent. A temperature therefore is preferably between −10 and 55° C., and usually set in a room temperature. A ratio of the cellulose triacetate to the solvent is determined in accordance with a layer-structure in the cellulose triacetate film.

The solution 33b for the intermittent layer 31b preferably contains cellulose triacetate between 13 and 27 wt. %, particularly between 16 and 25 wt. %, especially between 19 and 23 wt. %. The solutions 33a, 33c for the front and rear layers 31a, 31c preferably contain cellulose triacetate between 9 and 23 wt. %, particularly between 12 and 21 wt. %, especially between 15 and 19 wt. %. Further, after mixing, it is preferable to enough agitate the cellulose triacetate. Other materials may be added, for example, plasticizer, deterioration inhibitor, dynes and ultraviolet absorptive agent.

(Heating Process)

After swelling the cellulose triacetate particles, the mixed solutions are preferably heated at a predetermined temperature over 130° C., particularly over 160° C., and especially over 180° C. However over 250° C., cellulose triacetate is discomposed, which causes to damage the film to be produced. An averaged difference of increased temperatures per a minuet between start and end of heating is preferably more than 1° C./min., particularly more than 2° C./min., especially 4° C./min., and more especially 8° C./min, and upper limits thereof is theoretically 10000° C./min., technically 1000° C./min., and practically 100° C./min. There are methods of heating, for example, autoclave, mutitube heat interchanger, screw pressure and static mixer.

A time length for heating the mixed solution is preferably between 20 seconds and 4 hours. When the time length is less than 20 seconds, unsolved materials remain in the dope solution. When filtration of the unsolved materials is carried out, a filtration life becomes shorter. The time length starts to be counted when the temperature reaches the predetermined temperature, and ends to be counted when the temperature become lower than the predetermined temperature.

(Pressure-Applying Process)

Preferably, the mixture solution is heated thereby under applying pressure so as to prevent the solvent from boiling, and the temperature thereof is more than a boiling point under atmospheric pressure. Thus, the dope solution can have uniformity of quality. The pressure to be applied is adjusted in relation of the temperature of the solution to the boiling point of the solvent.

(Cooling Process)

When the cellulose triacetate hardly solves in the solvent and remains as unsolvable material in the solution, the solutions may be cooled between −100 and −10° C. before or after being heated, so as to obtain the film having a good photographic character. When the mixture solution is cooled down, the solvent penetrates in the cellulose triacetate smoothly. Whether cellulose triacetate solves enough, it can be perceived with eyes. When it does not solve enough, the heating process and the cooling process are repeated. Note that in the cooling process, in order to prevent a mixture of water in the mixed solvent, a vessel to be used is preferably tightly-closed. Further, when the pressure is made lower in the cooling process, the temperature becomes lower in shorter time. Accordingly, the vessel is preferably pressure-tight.

(Relation of Sharing Viscosities)

In order to prevent the generation of the skinning on an lip of the die, A/B and A'/B are preferably under 0.9 when A, A' and B are respectively determined as a sharing viscosity of the solution 33a for the front layer 31a, that of the solution 33c for the rear layer 31c and that of the solution 33b for the intermittent layer 33b. The sharing viscosities A, A' are between 30 and 50 Pa·S and the sharing viscosity B is between 10 and 150 Pa·S, when a sharing velocity is between 1 and 3000 (1/sec) and the temperature for producing the film is between 30 and 40° C. Note that, when the intermittent layer is constructed of plural layers, the sharing viscosity B is an average of sharing viscosities of the plural layers.

[Products]

The film produced in the method described above is used as a deflector film. Further, the film is used as the optical compensation film when an optical compensation sheet is attached on the film.

[Experiment 1]

(Preparation of Solution Composing Dope Solution)

In Experiment 1 a solution S1 is used for the intermittent layer and made from following compounds in the above-described method for preparing the dope solution.

| | |
|---|---|
| cellulose triacetate | 100 part by weight |
| triphenylphosphate | 7.8 part by weight |
| biphenyldiphenylphosphate (plasticiser) | 3.9 part by weight |
| methylenchloride (first solvent) | 300 part by weight |
| methanol (second solvent) | 65 part by weight |
| ultraviolet absorptive agent | 1.0 part by weight |

Note that the cellulose triacetate used in Experiment 1 has 60.9% of acetification degree. The solid content density of the solution S1 is 23.4 wt. %, and the additives are mixed in ratio of 13 wt. % to the cellulose triacetate.

In Experiment 1 a solution S2 is used for the surface layer, and made from the following compounds.

| | |
|---|---|
| cellulose triacetate | 87 part by weight |
| triphenylphosphate | 6.8 part by weight |
| biphenyldiphenylphosphate (plasticiser) | 3.4 part by weight |

-continued

| | |
|---|---|
| methylenchloride (first solvent) | 300 part by weight |
| methanol (second solvent) | 65 part by weight |
| ultraviolet absorptive agent | 0.9 part by weight |

The solid content density of the solution S2 is 21.0 wt. %, and the additives are mixed in ratio of 13 wt. % to the cellulose triacetate.

In Experiment 1, a solution S3 is also used for the surface layer, and made from the following compounds.

| | |
|---|---|
| cellulose triacetate | 77 part by weight |
| triphenylphosphate | 6.0 part by weight |
| biphenyldiphenylphosphate (plasticiser) | 3.0 part by weight |
| methylenchloride (first solvent) | 300 part by weight |
| methanol (second solvent) | 65 part by weight |
| ultraviolet absorptive agent | 0.9 part by weight |

The solid content density of the solution S3 is 19.0 wt. %, and the additives are mixed in ratio of 13 wt. % to the cellulose triacetate.

(Condition for Feeding Solvent)

The solvent fed to the end of the slit of the die is a mixture of methanol (bad solvent to the cellulose triacetate) and methylenechloride (good solution to the cellulose triacetate) in ratio of 50:50. The solvent is fed in the feeding velocity of 0.2 ml/min.

(Embodiment 1)

In Embodiment 1 (E1), the solution S2 is used for the surface layers. In producing the film, the die 4 of the feed block type is used. The film is formed such that the averaged thickness of the film after drying the dope solution may be 60 μm, (S1+S2)D×100 may be 5%, and ratio (A/B) may be 0.72 when A and B are the shearing viscosity of the solution for the surface layer and that of the solution for the intermittent layer respectively.

(Embodiment 2)

In Embodiment 2 (E2), the film is produced in the same condition as in Embodiment 1, except that (S1+S2)D×100 is 30%.

(Embodiment 3)

In Embodiment 3 (E3), the solution S3 is used for the surface layer. In producing the film, the die 4 is used. The film is formed such that the averaged thickness of the film after drying the solutions may be 60 μm, (S1+S2)D×100 may be 30%, and the ratio (A/B) may be 0.52.

(Embodiment 4)

In Embodiment 4 (E4), mixture solvent is fed to the end of the die in preparation of the film. Other condition is as same as in Embodiment 4.

(Comparision 1)

In Comparision 1 (C1), the film is formed only of the solution S1. In this case, (S1+S2)D×100 is 0, and the ratio A/B is 1. Other conditions are as same as in Embodiment 1.

(Comparision 2)

In Comparision 2 (C2), the mixture solvent is fed to the end of the die in preparation of the film. Other condition is as same as in Embodiment 1.

(Evaluation 1)

Evaluation of the film is made to generation frequency of skinning as follows:

| | |
|---|---|
| The skinning generates in few days | N |
| The skinning generates after more than a month | U |
| The skinning generates after more than three months | G |
| The skinning generates after more than six months | B |

Herein N, U, G, B mean "not usable", "usable", "good" and "best" respectively.

(Evaluation 2)

Evaluation of surface situation of film is made as follows:

| | |
|---|---|
| Worse than the limitation of usable quality | N |
| As same as the limitation of usable quality | U |
| More than the limitation of usable quality | G |

Herein N, U, G mean "not usable", "usable" and "good" respectively.

TABLE 1

| | E1 | E2 | E3 | E4 | C1 | C2 |
|---|---|---|---|---|---|---|
| Solution for surface layer | S2 | S2 | S3 | S3 | — | — |
| (S1 + S2)/D (%) | 5 | 30 | 30 | 30 | 0 | 0 |
| A/B | 0.72 | 0.72 | 0.52 | 0.52 | 1 | 1 |
| Feeding solvent | No | No | No | Yes | No | Yes |
| Evaluation 1 | G | G | G | B | N | B |
| Evaluation 2 | U | G | G | G | N | U |

The results shown in Table 1 teaches that the film becomes better when it is formed of the solution S3 having a lower solid content density than the solution S2. Accordingly, the dope solution used for producing the film preferably has the lower solid content density. Further, when the mixture solvent is fed to the end of the die, the quality of the film becomes higher.

[Experiment 2]

In Experiment 2, methylacetate is used as the main solvents of the dope solution. Evaluations of the embodiments 5–8 and Comparisions 3,4 are as same as those of Embodiment 1–5 and Comparisions 1,2.

(Preparation of Solution Composing Dope Solution)

In Experiment 2, a solution S4 is used for the intermittent layer, and made from following compounds in the above-described method for preparing the solution S4.

| | |
|---|---|
| cellulose triacetate | 100 part by weight |
| triphenylphosphate | 7.8 part by weight |
| biphenyldiphenylphosphate (plasticiser) | 3.9 part by weight |
| methyl acetate (first solvent) | 260 part by weight |
| mixture solvent (second solvent) | 110 part by weight |
| ultraviolet absorptive agent | 0.9 part by weight |

The mixture solvent of the second solvent contains acetone, ethanol, methanol, n-butanol in ratio 2:1:1:1. The solid content density of the solution S4 is 23.4 wt. %, and the additives are mixed in ratio of 13 wt. % to the cellulose triacetate.

In Experiment 2, a solution S5 is used for the surface layer, and made from the following compounds.

| cellulose triacetate | 87 part by weight |
| triphenylphosphate | 6.8 part by weight |
| biphenyldiphenylphosphate (plasticiser) | 3.4 part by weight |
| methylenchloride (first solvent) | 265.5 part by weight |
| methanol (second solvent) | 113.6 part by weight |
| ultraviolet absorptive agent | 0.9 part by weight |

The solid content density of the solution S5 is 20.6 wt. %, and the additives are mixed in ratio of 13 wt. % to the cellulose triacetate.

In Experiment 2, a solution S6 is used for the surface layer is made from the following compounds.

| cellulose triacetate | 77 part by weight |
| triphenylphosphate | 6.0 part by weight |
| biphenyldiphenylphosphate (plasticiser) | 3.0 part by weight |
| methyl acetate (first solvent) | 266.5 Part by weight |
| mixture solvent (second solvent) | 114.3 part by weight |
| ultraviolet absorptive agent | 0.9 part by weight |

The solid content density of the solution S6 is 18.6 wt. %, and the additives are mixed in ratio of 13 wt. % to the cellulose triacetate.

(Embodiment 5)

In Embodiment 5 (E5), the solution S4 is used for the surface layers. In producing the film, a die of the feed block type is used. The film is formed such that the averaged thickness of the film after drying the dope solutions may be 60 μm, (S1+S2)D×100 may be 5%, and the ratio A/B may be 0.68.

(Embodiment 6)

In Embodiment 6 (E6), the film is produced in the same condition as in Embodiment 5, except that (S1+S2)D×100 is 25%.

(Embodiment 7)

In Embodiment 7 (E7), the solution S6 is used for the surface layer. In producing the film, a die of the feed block type is used. The film is formed such that the averaged thickness of the film after drying the solution S6 may be 60 mm, (S1+S2)D×100 may be 25%, and the ratio A/B may be 0.47.

(Embodiment 8)

In Embodiment 8 (E8), mixture solvent is fed to the end of the die in preparation of the film. Other condition is as same as in Embodiment 7.

(Comparision 3)

In Comparision 3 (C3), the film is formed only of the solution S4. In this case, (S1+S2)D×100 is 0%, and the ratio A/B is 1. Other conditions are as same as in embodiment 5.

(Comparision 4)

In Comparision 4 (C4), the mixture solvent is fed to the end of the die in preparation of the film. Other condition is as same as in Embodiment 3.

TABLE 2

|  | E5 | E6 | E7 | E8 | C3 | C4 |
|---|---|---|---|---|---|---|
| Solution for surface layer | S5 | S5 | S6 | S6 | — | — |
| (S1 + S2)/D (%) | 5 | 25 | 25 | 25 | 0 | 0 |
| A/B | 0.68 | 0.68 | 0.47 | 0.47 | 1 | 1 |

TABLE 2-continued

|  | E5 | E6 | E7 | E8 | C3 | C4 |
|---|---|---|---|---|---|---|
| Feeding solvent | No | No | No | Yes | No | Yes |
| Evaluation 1 | G | G | G | B | N | B |
| Evaluation 2 | U | G | G | G | N | G |

The results shown in Table 2 is almost as same as that in the Table 1. The methylenechloride halmfully influences on circumstance. Accordingly, the present invention is carried out by using methylacetate which has no influence on circumstance so much.

[Experiment 3]

In Experiment 3 chloride solvents are used in the dope solution. To the dope solution, a 40° C. warm air is blown to form the film whose total thickness is 80 μm, and after peeled from the supporter, the film is dried in 120° C. for 10 minutes.

(Embodiment 9)

In Embodiment 9 (E9), the film is produced so as to have only one layer.

(Embodiment 10)

In Embodiment 10 (E10), the film is produced by using the die 4 illustrated in FIG. 4 so as to have three layers.

(Embodiment 11)

In Embodiment 11 (E11), the film is produced by using the die 4 illustrated in FIG. 4 so as to have two layers.

(Embodiment 12)

In Embodiment 12 (E12), the film is produced so as to have only one layer.

(Embodiment 13)

In Embodiment 13 (E13), the film is produced by using the die 4 illustrated in FIG. 4 so as to have three layers.

(Embodiment 14)

In Embodiment 14 (E14), the film is produced by using the die 4 illustrated in FIG. 4 so as to have three layers.

(Comparision 5)

In Comparision 5 (C5), the film is produced so as to have only one layer.

In Experiments 9–14 and Comparision 5, following solutions 7–11 are used. The composition of the each solution in the dope solution is as follows.

<Solution 7 (S7)>

| cellulose triacetate | 23 parts by weight |
| Ratio of masses (cotton linter/wood pulp = 60/40) | |
| triphenylphosphate | 3 parts by weight |
| mixture solvent | 74 part by weight |
| Ratio of masses (dichloromethane/methanol = 77/23) | |

<Solution 8 (S8)>

| cellulose triacetate | 23 parts by weight |
| Ratio of masses (cotton linter/wood pulp = 0/100) | |
| triphenylphosphate | 3 parts by weight |
| mixture solvent | 74 part by weight |
| Ratio of masses (dichloromethane/methanol = 77/23) | |

<Solution 9 (S9)>

| cellulose triacetate | 20 parts by weight |
| Ratio of masses (cotton linter/wood pulp = 0/100) | |
| triphenylphosphate | 3 parts by weight |
| mixture solvent | 77 part by weight |
| Ratio of masses (dichloromethane/methanol = 77/23) | |

<Solution 10 (S10)>

| cellulose triacetate | 23 parts by weight |
| Ratio of masses (cotton linter/wood pulp = 0/100) | |

-continued

| | |
|---|---|
| triphenylphosphate | 3 parts by weight |
| mixture solvent | 74 part by weight |
| Ratio of masses (dichloromethane/methanol = 76/24) | |
| <Solution 11 (S11)> | |
| cellulose triacetate | 23 parts by weight |
| Ratio of masses (cotton linter/wood pulp = 0/100) | |
| triphenylphosphate | 3 parts by weight |
| mixture solvent | 74 part by weight |
| Ratio of masses (dichloromethane/methanol = 77/23) | |

Citric acid (mold releasing accelerator) 300 PPM in weight of the solution S11.

(Method of Forming Deflector)

Polyvinyl alcohol film (75 μm) is set in iodine/potassium iodide solution and boric acid solution sequentially, and thereafter extended in a lengthwise direction of the film. Then the film is dried to form the polarizer.

Further, the film is set in alkali solution, acid solution and water sequentially. Thereafter the film is dried, and the process of the surface of the film is carried out. Then the film is adhered to the polarizer and dried again.

(Forming Estimation Panel for Estimation Frame)

An adhesive agent is applied to a surface of the deflector cut in size of 15 inches. Then the deflector is adhered to the both surfaces of a soda glass to form an estimation panel such that orientation axes of the deflector and the soda glass are perpendicular to each other.

(Estimation of Frame)

The estimation panel is processed in 40° C. and 95% atmosphere for 17 hours, and thereafter set in the room temperature for 24 hours. Thereafter, the estimation panel is disposed on a schaukasten, and optical creases are estimated with eyes as follows AA: there are no optical creases (best)

A: there are few obvious optical creases in edges of the frame (good)

B: there are distinct creases in the edges of the frame (usable)

C: there are creases also in a central part of the frame (unusable)

The result of Experiment 1 is shown in Table 3. In Table 3, L1, L2, L3 are respectively the uppermost, intermittent and lowest layers of the dope solution on the supporter. Further, H1, H2, H3 are respectively thickness of layers formed from the uppermost, intermittent, and lowest layers of the dope solution after dried. EV is ratio of the evaporated solvents to the film just after peeled from the supporter.

TABLE 3

| | Composition of dope | | | Thickness ratio | | | EV | Estimation | |
|---|---|---|---|---|---|---|---|---|---|
| | L1 | L2 | L3 | H1 | H2 | H3 | Wt % | 13 inch | 20 inch |
| E9 | S8 | S8 | S8 | — | — | — | 100 | A | B |
| E10 | S8 | S7 | S8 | 5 | 70 | 5 | 100 | A | B |
| E11 | S8 | S8 | S11 | — | 75 | 5 | 200 | AA | AA |
| E12 | S8 | S8 | S8 | — | — | — | 140 | AA | A |
| E13 | S9 | S8 | S9 | 5 | 70 | 5 | 100 | AA | A |
| E14 | S8 | S8 | S10 | 5 | 70 | 5 | 160 | AA | A |
| C5 | S7 | S7 | S7 | — | — | — | 100 | B | C |

[Experiment 4]

In Experiment 4 non-chloride solvents are used in the dope solution. To the dope solution, a 60° C. warm air is blown to form the film whose total thickness is 80 μm, and after peeled from the supporter, the film is dried in 120° C. for 10 minutes.

(Embodiment 15)

In Embodiment 15 (E15), the film is produced so as to have only a single layer.

(Embodiment 16)

In Embodiment 16 (E16), the film is produced by using the die 40 so as to have three layers.

(Embodiment 17)

In Embodiment 17 (E17), the film is produced by using the die 40 so as to have two layers.

(Embodiment 18)

In Embodiment 18 (E18), the film is produced so as to have only a single layer.

(Embodiment 19)

In Embodiment 19 (E19), the film is produced by using the die 40 illustrated in FIG. 7 so as to have three layers.

(Embodiment 20)

In Embodiment 20 (E20), the film is produced by using the dies 50a, 50b, 50c illustrated in FIG. 8 so as to have three layers.

(Comparision 6)

In Comparision 5 (C5), the film is produced so as to have only a single layer.

In Experiments 15–20 and Comparision 6, following solutions 12–16 are used. The composition of each solution in the solution is as follows.

| | |
|---|---|
| <Solution 12 (S12)> | |
| cellulose triacetate | 22 parts by weight |
| Ratio of masses (cotton linter/wood pulp = 60/40) | |
| triphenylphosphate | 3 parts by weight |
| mixture solvent | 74 part by weight |
| Ratio of masses (methyl acetate/acetone/alcohol = 45/20/15) | |
| <Solution 13 (S13)> | |
| cellulose triacetate | 22 parts by weight |
| Ratio of masses (cotton linter/wood pulp = 0/100) | |
| triphenylphosphate | 3 parts by weight |
| mixture solvent | 74 part by weight |
| Ratio of masses (methyl acetate/acetone/alcohol = 45/20/15) | |
| <Solution 14 (S14)> | |
| cellulose triacetate | 20 parts by weight |
| Ratio of masses (cotton linter/wood pulp = 0/100) | |
| triphenylphosphate | 3 parts by weight |
| mixture solvent | 77 part by weight |
| Ratio of masses (methyl acetate/acetone/alcohol = 45/20/15) | |
| <Solution 15 (S15)> | |
| cellulose triacetate | 22 parts by weight |
| Ratio of masses (cotton linter/wood pulp = 0/100) | |
| triphenylphosphate | 3 parts by weight |
| mixture solvent | 74 part by weight |
| Ratio of masses (methyl acetate/acetone/alcohol = 44/20/16) | |
| <Solution 16 (S16)> | |
| cellulose triacetate | 23 parts by weight |
| Ratio of masses (cotton linter/wood pulp = 0/100) | |
| triphenylphosphate | 3 parts by weight |
| mixture solvent | 74 part by weight |
| Ratio of masses (methyl acetate/acetone/alcohol = 45/20/15) | |

Citric acid (mold releasing accelerator) 300 PPM in weight of the solution S11.

In Experiment 4, the estimation panel is made and the estimation of is carried out as same as in Experiment 3.

TABLE 4

| | Composition of dope solution | | | Thickness ratio | | | EV wt % | Estimation 13 inch | Estimation 20 inch |
|---|---|---|---|---|---|---|---|---|---|
| | L1 | L2 | L3 | H1 | H2 | H3 | | | |
| E15 | S13 | S13 | S13 | — | — | — | 100 | A | B |
| E16 | S13 | S12 | S13 | 5 | 70 | 5 | 100 | A | B |
| E17 | S13 | S13 | S11 | — | 75 | 5 | 200 | AA | AA |
| E18 | S13 | S13 | S13 | — | — | — | 140 | AA | A |
| E19 | S14 | S13 | S14 | 5 | 70 | 5 | 100 | AA | A |
| E20 | S13 | S13 | S15 | 5 | 70 | 5 | 160 | AA | A |
| C6 | S12 | S12 | S12 | — | — | — | 100 | B | C |

Various changes and modifications are possible in the present invention and may be understood to be within the present invention.

What is claimed is:

1. A method of producing a cellulose ester film constructed of plural layers by using a die having plural manifold, comprising steps of
   doping on a supporter a dope solution composed of solutions contained in said respective manifold, a solvent of said dope solution being alcohol having 1–10 carbons and including more than 15 wt. % of hydrocarbon;
   drying said dope solution on said supporter to form said cellulose ester film;
   peeling said cellulose ester film from said supporter; and
   drying said cellulose ester film after peeling from said supporter such that in at least one of surface layers of said plural layers a mass ratio of cotton linter and wood pulp (cotton linter/wood pulp) is 5/95–0/100.

2. A method according to claim 1, wherein other layers than said surface layers of said cellulose ester film are formed from one or more of said plural solutions of cotton linter and wood pulp in ratio of mass (cotton linter/wood pulp) between 5/95 and 0/100.

3. A method according to claim 1, wherein a peeling accelerator is added to said dope solution.

4. A method according to claim 3, wherein said dope solution is composed of plural solutions, one of said plural solutions contains said peeling accelerator and is doped so as to lie on said supporter.

5. A method according to claim 1, wherein after peeling from said supporter and drying, when P, Q and R are solid mass of said cellulose ester film, evaporated mass from said dope solution and a ratio of evaporated solvents to said cellulose ester film respectively, R is determined as (Q/P)× 100 (wt. %) and more than 120 wt. %.

6. A method according to claim 2, wherein said solutions are a first solution, a second solution and a third solution, said first and third solutions are used for each of said surface layers, solid content density of said first and third solutions are 0.5% lower than that of said second solution.

7. A method according to claim 6, wherein said third solution is doped so as to contact to said supporter, and content of alcohol of 1–10 carbon numbers and carbon hydride in a solvent of said third solution is more than 1% larger than said first and second solutions.

8. A method according to claim 1, wherein a surface temperature of said supporter is between −20 and 25° C.

9. A method according to claim 1, wherein said cellulose ester film is used as a deflector protecting film.

10. A method of producing a cellulose ester film by using a die provided with a feed block in which plural solutions are superposed so as to have a smaller width than on a lip of said die, said method comprising steps of:
    doping on a supporter a dope solution composed of solutions superposed in said feed block, a solvent of said dope solution being alcohol having 1–10 carbons and including more than 15 wt. % of hydrocarbon;
    drying said dope solution on said supporter to form said cellulose ester film constructed of a same number of layers as said plural solutions;
    peeling said cellulose ester film from said supporter; and
    drying said cellulose ester film after peeling from said supporter, such that in at least one of surface layers of said cellulose ester film a mass ratio of cotton linter and wood pulp (cotton linter/wood pulp) is between 5/95 and 0/100.

11. A method according to claim 10, wherein other layers than said surface layers of said cellulose ester film are formed from one or more of said plural solutions of cotton linter and wood pulp in ratio of mass (cotton linter/wood pulp) 5/95–0/100.

12. A method according to claim 10, wherein a peeling accelerator is added to said dope solution.

13. A method according to claim 12, wherein said dope solution is composed of plural solutions, one of said plural solutions contains said peeling accelerator and is doped so as to conform to said supporter.

14. A method according to claim 10, wherein after peeling from said supporter and drying, when P. Q and R are solid mass of said cellulose ester film, evaporated mass from said dope solution and a ratio of evaporated solvents to said cellulose ester film respectively, R is determined as (Q/P)× 100 (wt. %) and more than 120 wt. %.

15. A method according to claim 11, wherein said solutions are a first solution, a second solution and a third solution, said first and third solutions are used for each of said surface layers, solid content density of said first and third solutions are 0.5% lower than that of said second solution.

16. A method according to claim 15, wherein said third solution is doped so as to contact to said supporter, and content of alcohol of 1–10 carbon numbers and carbon hydride in a solvent of said third solution is more than 1% larger than said first and second solutions.

17. A method according to claim 10, wherein a surface temperature of said supporter is between −10 and 25° C.

18. A method according to claim 10, wherein said cellulose ester film is used as a deflector protecting film.

19. A method of producing a cellulose ester film by using plural dies, comprising steps of:
    doping on a supporter a same number of dope solutions as said plural dies, a solvent of said dope solutions being alcohol having 1–10 carbons and including more than 15 wt. % of hydrocarbon;
    drying said dope solution on said supporter to form said cellulose ester film composed of a same number of layers as said plural die;
    peeling said cellulose ester film from said supporter; and
    drying said cellulose ester film after peeling from said supporter, such that in at least one of surface layers of said cellulose ester film a mass ratio of cotton linter and wood pulp (cotton linter/wood pulp) is between 5/95 and 0/100.

* * * * *